UNITED STATES PATENT OFFICE.

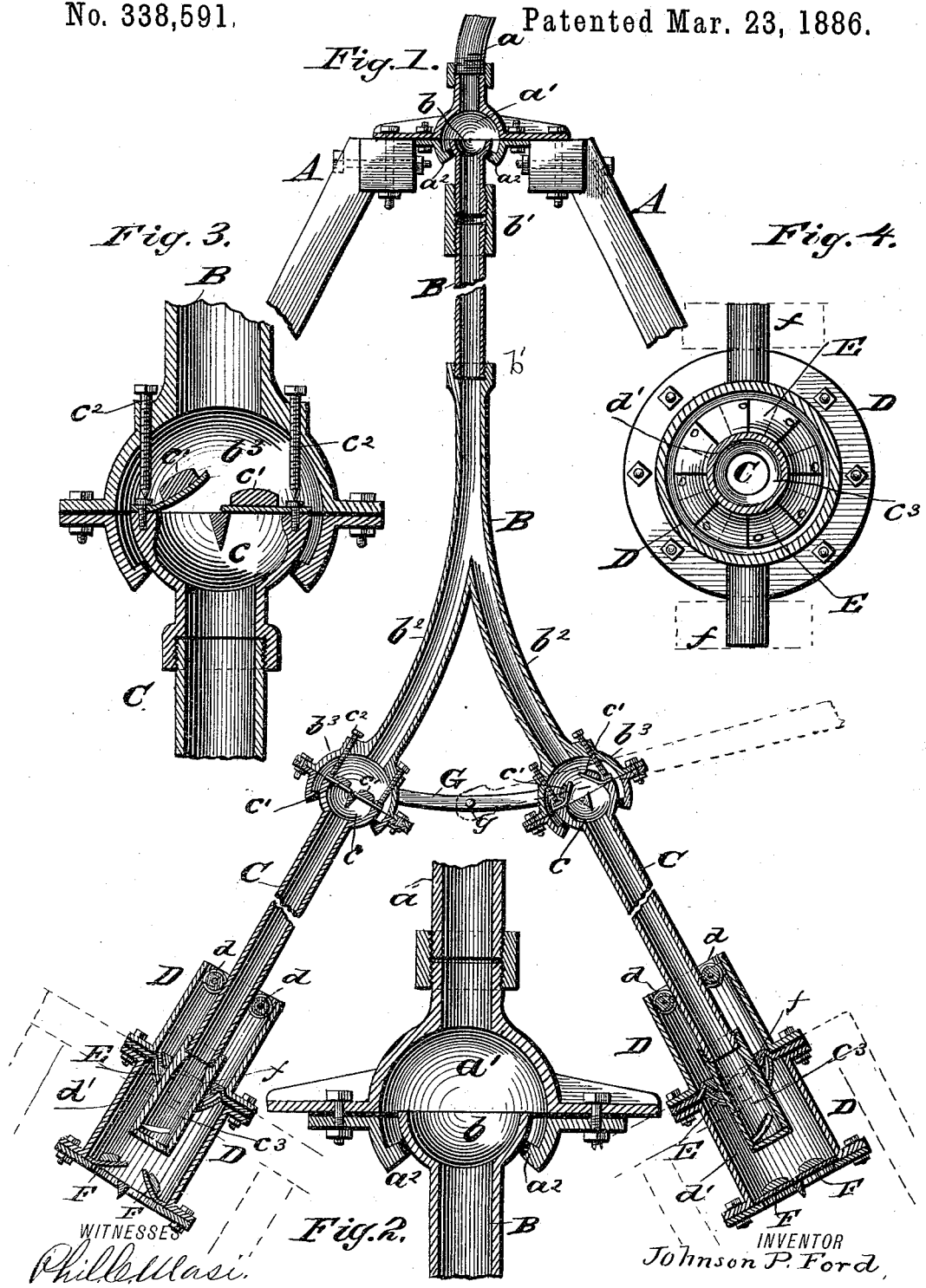

JOHNSON P. FORD, OF FRAZIER, CALIFORNIA.

PUMP.

SPECIFICATION forming part of Letters Patent No. 338,591, dated March 23, 1886.

Application filed December 13, 1884. Renewed January 16, 1886. Serial No. 188,805. (No model.)

*To all whom it may concern:*

Be it known that I, JOHNSON P. FORD, a citizen of the United States, residing at Frazier, in the county of Tulare and State of California, have invented certain new and useful Improvements in Pumps; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical sectional view of my device. Fig. 2 is a detail sectional view. Fig. 3 is a similar view, and Fig. 4 is a horizontal sectional view.

This invention is a pump of novel design and construction, capable of being used for a variety of purposes, but principally adapted for pumping out mines.

The general construction of the invention is as follows: A pipe bifurcated at its lower end has at its upper end a hollow ball-and-socket joint. The upper end of said pipe is enlarged and works in connection with a hollow socket, which is secured to a suitable bearing. The enlarged end of the pipe, which is usually hemispherical, is retained within the socket by the inward curvature of the latter, which has its meeting edge to conform in curvature to the outside of the hemispherical end of the pipe, (proper packing being put between the two.) From the socket, which is stationary and bolted to a proper frame-work, extends a pipe to conduct the water from the pump to any place desired. Below the fixed socket-piece is the pump proper connected thereto, as above stated. The lower part of the pipe of the pump is bifurcated, forming two similar curved arms, each having a similar ball-and-socket joint at its lower end. The lower end of each curved arm is enlarged, and forms about two-thirds of a hollow sphere. Within this partially rotates or oscillates the enlarged hemispherical upper end of a straight hollow plunger provided with one or more upwardly-opening valves, (in practice two equal and similar valves are used.) The lower end of each plunger passes into a cylinder, pivoted or trunnioned upon proper supports at its lower end, so that as the pipe vibrates or oscillates both cylinders turn on their trunnions. The lower end of each cylinder is provided with one or more upwardly-opening valves, (two being usually employed.) At the upper end of each cylinder its plunger passes between rollers to make its action easy, and about midway in the cylinder the plunger reciprocates in packing to make it air-tight and causes the cylinder-valves to open and close. This packing is composed of inwardly-inclining leaves fixed to the cylinder and surrounding the plunger, and it is arranged in rows or tiers, the outer one of which overlies and breaks the joints of the inner one. When the main pipe is vibrated to one side, out of the perpendicular, the plunger on that side turns on its ball-and-socket joint and is driven into its cylinder, closing the valves of the latter, the cylinder turning on its trunnions to permit this motion. The opposite cylinder in the meanwhile comes into position to have its valves opened, so as to admit water into its hollow plunger. The motion that opens the valves of the cylinder causes the valves in the joint between the plunger and bifurcated arm to close. As the main pipe returns to the perpendicular the valves in the first cylinder open and the valves in the corresponding plunger close.

The main pipe and connection are vibrated and oscillated regularly and equally to each side of a vertical line passing through the upper ball-and-socket joint in the following manner: A transverse rod is connected to the shells of the joints at the lower ends of the bifurcations of the main pipe, and is provided on its center between said hemispherical ends with a connecting-pin to which a crank and pitman or equivalent actuating mechanism is attached. The cylinders act alternately, the weight of the water in the main pipe being sustained by the closed valves of one ball-and-socket joint, while the cylinder connected with the other joint is forcing water through its plunger, the valves of said cylinder being closed. At the same time the valves of the cylinder connected with the plunger having its valves closed are open and admitting water to the cylinder.

In the accompanying drawings, A represents a proper frame-work, upon which the upper part of the ball-and-socket joint or the socket at the upper end of the main pipe is bolted, and $a$ is a pipe or tube of proper shape connected with the same to conduct the water away from the pump.

$a'$ is the socket of the ball-and-socket joint, having its edge turned inward at $a^2$, and curved so as to conform to the curvature of the enlarged hemispherical end $b$ of the main pipe B, (proper packing being put in position with the joint.)

B is the main pipe having in practice a joint, $b'$, below the ball-and-socket joint, upon which it vibrates, and bifurcated at a proper point into the two similar curved arms, $b^2 b^2$. Each arm $b^2$ has its end enlarged and formed into about two-thirds of a hollow sphere, $b^3$. The said part $b^3$ is made with its lower part separate and flanged, and bolted into its upper part, as shown in the drawings. The part $b^3$ is turned inwardly below, and has its edge made concave to allow the enlarged hemispherical upper end of the plunger C to turn properly and easily therein, (proper packing being put between the two.)

$c'\ c'$ are similar upwardly-opening valves on the top of the part $c$, the inner edges of which rest upon a transverse bar across the same.

$c^2\ c^2$ are check-screws passing through $b^3$, and having their points bearing upon the screws which fasten the hinges of the valves $c'$, so as to prevent the same from becoming loose and causing leakage.

C is a straight hollow plunger, the lower end of which passes into the cylinder D. The said plunger where it passes into the cylinder runs between the rollers $d\ d$ to make its motion easy.

D is the cylinder, the upper part of which is of less diameter than the lower part and bolted thereto. If desired, the upper part may be replaced by longitudinal braces, upon which the rollers $d$ may be pivoted. The lower part, $c^3$, of the plunger which plays in the lower part, $d'$, of the cylinder is enlarged and properly packed to pass straight between the packing-springs E, the outer ends of which are secured to the cylinder, the inner end inclining inwardly and downwardly, surrounding and clasping the plunger. The springs E are usually arranged in two rows or tiers, the outer row overlying the inner row and breaking the joints of the same. Each row has preferably eight leaves.

F F are the upwardly-opening valves at the lower end of the cylinder, properly secured thereto by their outer edges, and having their inner edges resting upon a transverse bar across the bottom of the cylinder.

$f f$ are trunnions upon which the cylinder turns. Said trunnions have bearings in any proper support, and allow the cylinders to vibrate with the motion of the main pipe, being arranged transversely to the plane of motion.

G is a bar, made, preferably, on the arc of a circle struck from the center of the upper ball-and-socket joint or the center of vibration of the pump and connecting the hemispherical lower ends of the arms of the main pipe.

$g$ is a connecting-pin standing from the center of the bar G equally distant from the centers of the opposite ball-and-socket joints.

Any proper mechanism to vibrate the main pipe and connections (such as a pitman, shown in dotted lines, Fig. 1) may be connected to the pin $g$.

The bar G also serves the purpose of a brace to keep the arms of the main pipe from trembling or working unsteadily under a heavy pressure of water.

Having thus described my invention, what I claim as new, and desire to secure by Letters Patent, is—

1. An oscillating or vibrating pump composed of a main discharge-pipe pivoted at and vibrated upon its upper end and bifurcated at its lower end, two similar cylinders each provided at its lower end with one or more upwardly-opening valves, and trunnioned at said end transversely to the plane of motion of the main pipe, and two hollow plungers each working air-tight at its lower end in a cylinder, and having its upper end, which is provided with one or more upwardly-opening valves, connected to one arm of the bifurcated main pipe by a ball-and-socket joint, substantially as specified.

2. In an oscillating or vibrating pump, the combination of a proper frame-work, A, having the part $a$ of the ball-and-socket joint fixed thereto, the vibrating bifurcated main pipe B, provided with the hemispherical upper end, $b$, and the enlarged and rounded lower end, $b^3$, and the plungers C C, having upwardly-opening valves in their enlarged upper ends, with proper mechanism for vibrating the main pipe and its connections, substantially as specified.

3. In an oscillating pump, the combination of a main discharge-pipe pivoted at and vibrating upon its upper end, and a valved receiving-cylinder pivoted transversely to and vibrating in the plane of motion of the main pipe, with a hollow valved plunger working in the cylinder and jointed to the main pipe.

4. In a vibrating or oscillating pump, the combination, with the vibrating main pipe B, the plunger C, and trunnioned cylinders D, of the bar G, connecting and bracing the lower ends of the bifurcated arms of said main pipe, the pin $g$, and mechanism attached to said pin and adapted to vibrate or oscillate the main pipe, plungers, and cylinders, substantially as specified.

In testimony whereof I affix my signature in presence of two witnesses.

JOHNSON P. FORD.

Witnesses:
W. H. McKENZIE,
L. R. WILLIAMS.